(12) United States Patent
Muranaka et al.

(10) Patent No.: US 9,571,470 B2
(45) Date of Patent: Feb. 14, 2017

(54) COMMUNICATION SYSTEM, MANAGEMENT SERVER, SERVER, CONCENTRATOR, AND ENCRYPTION SETTING METHOD

(71) Applicant: Hitachi, Ltd., Tokyo (JP)

(72) Inventors: Nobuyuki Muranaka, Tokyo (JP); Yuji Ogata, Tokyo (JP); Toshimitsu Hayashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 93 days.

(21) Appl. No.: 14/705,045

(22) Filed: May 6, 2015

(65) Prior Publication Data

US 2016/0065543 A1 Mar. 3, 2016

(30) Foreign Application Priority Data

Aug. 27, 2014 (JP) .................................. 2014-172190

(51) Int. Cl.
*H04L 29/06* (2006.01)
*H04L 29/12* (2006.01)

(52) U.S. Cl.
CPC .......... *H04L 63/0428* (2013.01); *H04L 63/06* (2013.01); *H04L 61/2007* (2013.01); *H04L 61/2076* (2013.01); *H04L 63/164* (2013.01)

(58) Field of Classification Search
CPC .... H04L 63/0428; H04L 63/06; H04L 63/164; H04L 61/2076; H04L 61/2007
See application file for complete search history.

(56) References Cited

U.S. PATENT DOCUMENTS

| | | | |
|---|---|---|---|
| 2006/0133354 A1* | 6/2006 | Lee ................... | H04L 29/12509 370/352 |
| 2010/0094758 A1* | 4/2010 | Chamberlain ... | G06Q 10/06375 705/50 |
| 2011/0238798 A1* | 9/2011 | Seki ................... | G06K 15/4045 709/220 |

FOREIGN PATENT DOCUMENTS

JP 2006-246098 A 9/2006

* cited by examiner

*Primary Examiner* — Eleni Shiferaw
*Assistant Examiner* — Mary Li
(74) *Attorney, Agent, or Firm* — Mattingly & Malur, PC

(57) ABSTRACT

After an IP address of a concentrator is changed by a management server (management platform), a server and the concentrator acquire the changed IP address of the concentrator at each communication, and changes encryption settings so that a set encryption key will be associated with the changed IP address.

9 Claims, 11 Drawing Sheets

FIG. 3A

| FIELD DEVICE ID | FIELD DEVICE IP ADDRESS | SERVER IP ADDRESS | ENCRYPTION KEY | COMMUNICATION DIRECTION |
|---|---|---|---|---|
| F1 | A1.A1.A1.A1 | B.B.B.B | X11.X11.X11.X11 | FIELD DEVICE → SERVER |
|  |  |  | X12.X12.X12.X12 | SERVER → FIELD DEVICE |
| F2 | A2.A2.A2.A2 | B.B.B.B | X21.X21.X21.X21 | FIELD DEVICE → SERVER |
|  |  |  | X22.X22.X22.X22 | SERVER → FIELD DEVICE |
|  |  |  |  |  |

FIG. 3B

| FIELD DEVICE ID | FIELD DEVICE IP ADDRESS | SERVER IP ADDRESS | ENCRYPTION KEY | COMMUNICATION DIRECTION |
|---|---|---|---|---|
| F1 | A1'.A1'.A1'.A1' | B.B.B.B | X11.X11.X11.X11 | FIELD DEVICE → SERVER |
|  |  |  | X12.X12.X12.X12 | SERVER → FIELD DEVICE |
| F2 | A2.A2.A2.A2 | B.B.B.B | X21.X21.X21.X21 | FIELD DEVICE → SERVER |
|  |  |  | X22.X22.X22.X22 | SERVER → FIELD DEVICE |
|  |  |  |  |  |

FIG. 4A

| FIELD DEVICE ID (40-1) | FIELD DEVICE IP ADDRESS (40-2) | SERVER IP ADDRESS (40-3) | ENCRYPTION KEY (40-4) | COMMUNICATION DIRECTION (40-5) |
|---|---|---|---|---|
| F1 | A1.A1.A1.A1 | B.B.B.B | X11.X11.X11.X11 | FIELD DEVICE → SERVER |
|  |  |  | X12.X12.X12.X12 | SERVER → FIELD DEVICE |

FIG. 4B

| FIELD DEVICE ID (40-1) | FIELD DEVICE IP ADDRESS (40-2) | SERVER IP ADDRESS (40-3) | ENCRYPTION KEY (40-4) | COMMUNICATION DIRECTION (40-5) |
|---|---|---|---|---|
| F1 | A1'.A1'.A1'.A1' | B.B.B.B | X11.X11.X11.X11 | FIELD DEVICE → SERVER |
|  |  |  | X12.X12.X12.X12 | SERVER → FIELD DEVICE |

| FIELD DEVICE ID | LAST ALLOCATED IP ADDRESS |
|---|---|
| F1 | A1.A1.A1.A1 |
| F2 | A2.A2.A2.A2 |
|  |  |

FIG. 6B

| FIELD DEVICE ID | LAST ALLOCATED IP ADDRESS |
|---|---|
| F1 | A1'.A1'.A1'.A1' |
| F2 | A2.A2.A2.A2 |
|  |  |

FIG. 10

| FIELD DEVICE ID | COMMUNICATION PERIOD | NEXT COMMUNICATION TIME | NEXT IP ADDRESS CHECK TIME | TIME RANGE |
|---|---|---|---|---|
| F1 | 30 [min] | y1/m1/d1 14:03:23 | y1/m1/d1 14:03:00 | y1/m1/d1 14:03:00 TO 14:06:00 |
| F2 | 30 [min] | y1/m1/d1 14:05:34 | y1/m1/d1 14:03:00 | y1/m1/d1 14:03:00 TO 14:06:00 |
| F3 | 30 [min] | y1/m1/d1 14:04:12 | y1/m1/d1 14:03:00 | y1/m1/d1 14:03:00 TO 14:06:00 |
| F4 | 30 [min] | y1/m1/d1 14:06:21 | y1/m1/d1 14:06:00 | y1/m1/d1 14:06:00 TO 14:09:00 |
| F5 | 30 [min] | y1/m1/d1 14:07:52 | y1/m1/d1 14:06:00 | y1/m1/d1 14:06:00 TO 14:09:00 |

FIG. 11

| FIELD DEVICE ID | FIELD DEVICE IP ADDRESS | SERVER IP ADDRESS | ENCRYPTION KEY | COMMUNICATION DIRECTION |
|---|---|---|---|---|
| F1 | A1.A1.A1.A1 | B.B.B.B | X11.X11.X11.X11 | FIELD DEVICE → SERVER |
| | | | X12.X12.X12.X12 | SERVER → FIELD DEVICE |
| F1 | A1'.A1'.A1'.A1' | B.B.B.B | X11.X11.X11.X11 | FIELD DEVICE → SERVER |
| | | | X12.X12.X12.X12 | SERVER → FIELD DEVICE |
| F2 | A2.A2.A2.A2 | B.B.B.B | X21.X21.X21.X21 | FIELD DEVICE → SERVER |
| | | | X22.X22.X22.X22 | SERVER → FIELD DEVICE |

COMMUNICATION SYSTEM, MANAGEMENT SERVER, SERVER, CONCENTRATOR, AND ENCRYPTION SETTING METHOD

CROSS-REFERENCE TO RELATED APPLICATION

This application claims the priority of Japanese Patent Application No. 2014-172190 filed Aug. 27, 2014, which is incorporated herein by reference in its entirety.

BACKGROUND OF THE INVENTION

1. Field of the Invention

The present invention relates to a communication system and an encryption setting method for setting encryption of communication between a concentrator for which an IP address is dynamically set by a management server and a server.

2. Description of the Related Art

For management of utilities, optimization of distribution, and the like, sensor network systems including multiple wireless terminals with sensors (hereinafter referred to as field devices) placed in fields and being configured to gather and control information therefrom have been used. In related art, sensor network systems have been built in some regions by using local network environments. With the spread of carrier networks in recent years, however, field devices can transmit sensor data to servers in remote data centers by using existing public networks in regions without the need of building new network environments, and sensor network systems can thus be built in regions whether or not the regions are large or small. Furthermore, with the sophistication of information processing systems, machine-to-machine (M2M) systems in which field devices and servers operate under autonomous control without human intervention are also becoming widespread.

In such a wide area sensor network system or M2M system, the amount of data transmitted by a field device to a server is small, which is often smaller than 1 KB of data transmitted some dozen times a day on a periodic basis. In recent years, to meet the need for operation of these systems, many public network use plans with reduced minimum use charges for using the public networks and pay-as-you-go or graded charging according to packet communication volumes are provided. In such a public network use plan, reduction of the packet communication volume will be important since the packet communication volume is reflected in the use charge.

SUMMARY OF THE INVENTION

When a field device is to use a carrier network existing in a region, typically, an IP address is often dynamically allocated thereto. Furthermore, even when an IP address has been allocated once, if a field device continues to be in a state not in communication for a long time and a communication module thus enters a sleep state, for example, the field device has to receive allocation of an IP address again. Thus, the IP address of a field device may be changed during operation.

Furthermore, when a field device is to transmit data in a form of a packet to a server via a network existing in a region, the field device has to perform encryption before transmission since a public network is used for the transmission. Settings including an encryption key will be required for the encryption, but typically, not all the settings are conducted in advance for security reasons and the encryption settings are dynamically conducted at a point when encrypted communication is required.

The encryption settings inevitably involve communication of both parties that conduct packet communication. In view of the purpose of reducing the packet communication volume, once encryption settings are conducted, it is desirable to continue using the settings until expiration of the settings. In a typical embodiment, it is assumed that IPsec is employed for the encryption system and that both parties of communication build security association that is an encryption setting in the IKE protocol to conduct encrypted communication. In many cases, however, when the IP address of a field device is changed after encryption settings, the aforementioned settings are invalidated. As a result, communication for conducting encryption settings again will be caused each time the settings are invalidated, which increases the communication volume.

JP-2006-246098-A discloses a method for continuing with the security association between communication parties even when an IP address is changed as a result of a change in the position of a terminal under a variable IP address environment in which IP addresses are dynamically allocated to terminal devices connected to a subnetwork in a wireless LAN area or the like. In JP-2006-246098-A, however, notification of a changed IP address is conducted between a field device and a server, which does not overcome the problem of the increase in the communication volume. An object of the present invention is to continue encrypted communication without increasing the communication volume between a field device and a server in an environment in which IP addresses of field devices are dynamically changed.

To achieve the aforementioned object, a communication system, a management server, a server, a concentrator, and an encryption setting method according to the present invention are such that, in a communication system including multiple concentrators, a server, and a management server, which are connected via a network, the management server includes: an IP address setting unit configured to allocate an IP address to each of the concentrators when the concentrators connect to the network; and IP address management information for managing the IP addresses allocated to the concentrators for a predetermined time. The server includes: a first encryption key management unit configured to manage an encryption key set between the server and a concentrator to which a first IP address is allocated in association with the first IP address; a setting unit configured to acquire a second IP address allocated to the concentrator from the management server when a check time is reached, compare the acquired second IP address with the first IP address managed by the first encryption key management unit, and associate the encryption key associated with the first IP address with the second IP address when the first IP address and the second IP address do not match with each other as a result of the comparison; a reception unit, configured to receive encrypted packet data from the concentrator; and a processing unit configured to decrypt the received packet data with the encryption key. The concentrators each include: a second encryption key management unit configured to manage the encryption key set between the server and the concentrator in association with the first IP address allocated by the management server; an IP address holding unit configured to hold the second IP address allocated by the management server when connecting to the network; a setting unit configured to compare the first IP address managed by the second encryption key management unit with the second IP address held by the IP address holding unit before encrypting and transmitting the packet data to the server, and update the first IP address associated with the encryption key with the second IP address when the first IP address and the second IP address do not match with each other as a result of the comparison; a processing unit configured to encrypt the packet data with the encryption key; and a transmission unit configured to transmit the encrypted packet data to the server.

According to the present invention, both reduction in the communication volume of field devices and encrypted communication can be achieved in an environment in which IP addresses of field devices are dynamically changed.

Other objects, features, and effects than those described above will be apparent from the description of embodiments below.

BRIEF DESCRIPTION OF THE DRAWINGS

FIGS. 3A and 3B illustrate details of an encryption key management table of a server;

FIGS. 4A and 4B illustrate details of an encryption key management table of a field device;

FIGS. 6A and 6B illustrate details of an allocated IP address management table of an M2M management platform;

FIG. 10 illustrates details of a timer table of a server according to a second embodiment; and FIG. 11 illustrates details of an encryption key management table of a server according to a third embodiment.

DESCRIPTION OF THE PREFERRED EMBODIMENTS

A network system to which the present invention is applied will be described in detail below with reference to the drawings.

Basically, in the network system, for communication after an IP address of a field device has been changed, a data center (server) and the field device (concentrator) each acquire the changed IP address and changes encryption settings according thereto.

A field device may transmit data to a server some dozen times a day on a periodic basis, for example. The server can obtain the data transmission interval of the field device, and can predict the next time at which data will be transmitted. Furthermore, a management platform (management server) that has allocated an IP address to a field device holds an allocation history, and the server can acquire an updated IP address by inquiring the history.

First Embodiment

Figure 1:
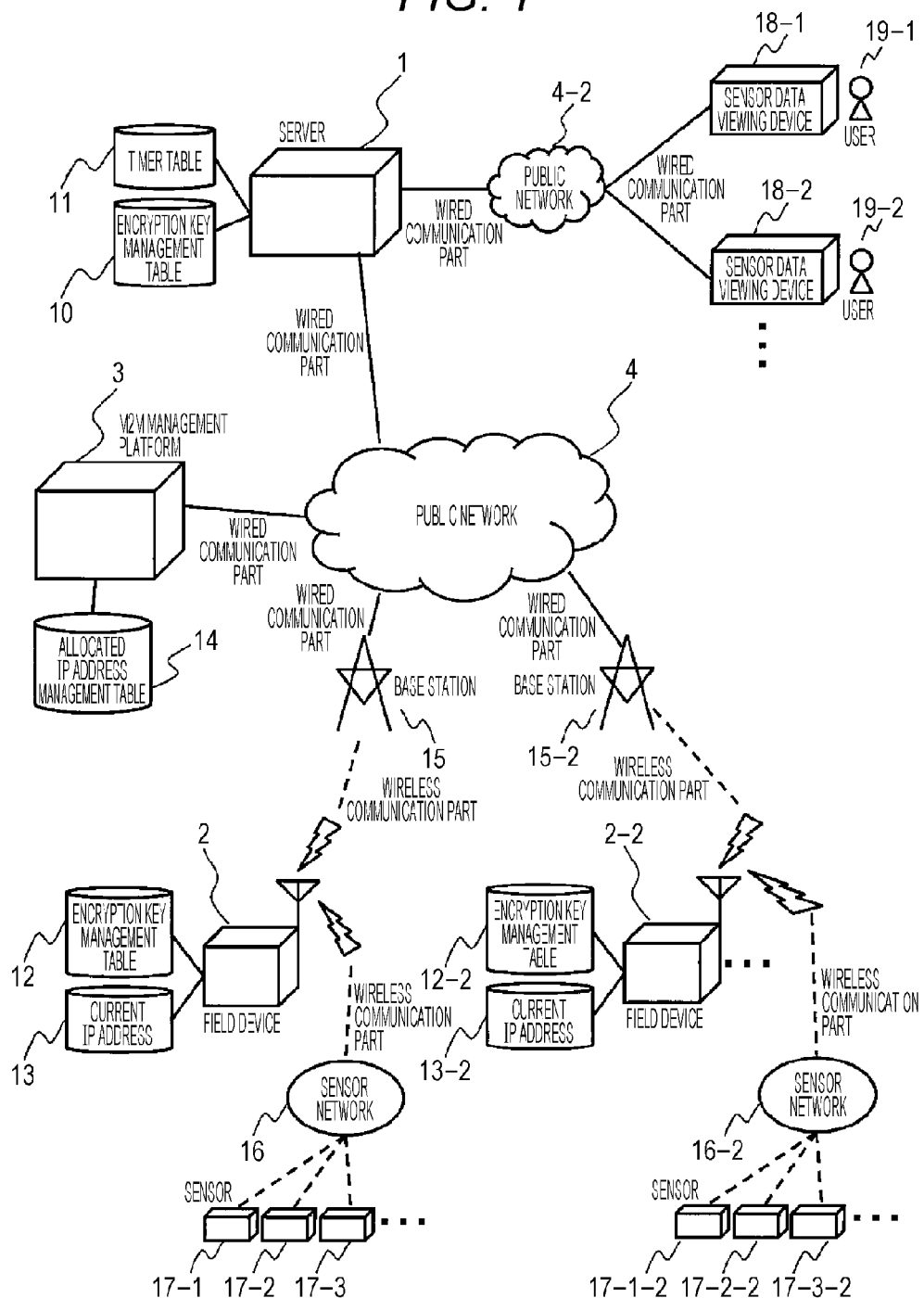
FIG. 1 is a configuration diagram of a network system according to an embodiment of the present invention.

FIG. 1 is a configuration diagram of a network system according to the present embodiment.

A server 1 is connected to a public network 4, and holds an encryption key management table 10 for transmission/reception of encrypted data from a field device 2 and a timer table 11 for management of transmission data periods. The server 1 transmits and receives packets to/from the field device 2 via the public network 4. The server 1 also conducts packet communication with an M2M management platform 3 via the public network 4.

The field device 2 is connected to the public network 4, and holds an encryption key management table 12 for transmission/reception of encrypted data to the server 1 and a current IP address 13. The field device 2 transmits and receives packets to/from the server 1 via the public network 4.

The field device 2 does not hold an IP address in advance. Instead, when the field device 2 connects to the public network 4, the field device 2 issues a connection request to the M2M management platform 3 to receive allocation of an IP address, and holds the allocated IP address at the current IP address 13.

In addition, when the field device 2 reconnects to the public network 4 at data transmission intervals, the field device 2 issues a reconnection request to the M2M management platform 3 to receive allocation of an IP address, and holds the allocated IP address at the current IP address 13.

The field device 2 includes a collection unit that collects sensor information such as temperature from a sensor 17 via a sensor network 16, and transmits the collected sensor information in a packet to the server via the base station 15 and the public network 4.

The field device 2 is a wireless terminal as illustrated in FIG. 1.

Examples of the sensor 17 include a temperature sensor, a humidity sensor, a distortion sensor, and an illuminance sensor.

The M2M management platform 3 allocates an IP address upon receiving a connection request from the field device 2, and holds the allocation result in a management table 14.

Communication between the M2M management platform 3 and the field device 2, or more specifically communication for a connection request and allocation of an IP address, is not packet communication but is conducted using the PPP (Point-to-Point Protocol) and the IPCP (IP Control Protocol), for example. Specifically, the communication between the M2M management platform 3 and the field device 2 is not packet communication, and is therefore not related to a public network use plan in which the packet communication volume is reflected in use charges.

FIGS. 6A and 6B illustrate details of the allocated IP address management table 14 of the M2M management platform 3. FIGS. 6A and 6B illustrate the table before and after update of the table, respectively, as a result of reallocation of an IP address to the field device.

The allocated IP address management table 14 holds a field device ID 60-1 and a last allocated IP address 60-2, and manages the latest IP address allocated to each field device 2.

The M2M management platform 3 invalidates an IP address allocated to a field device 2 when no communication is conducted to the allocated IP address for a predetermined time for effective use of a limited number of IP addresses. Specifically, entries 60-1 and 60-2 for the corresponding field device 2 in the IP address management table 14 are deleted from the table.

The M2M management platform 3 notifies an IP address reception unit 21-5 of the field device 2 that the IP address has been invalidated through notification of disconnection of control communication, and invalidates the current IP address 13 of the field device 2.

The IP address reception unit 21-5 of the field device 2 monitors the current IP address 13 and, if the IP address is invalidated, issues a reconnection request to the M2M management platform 3 to receive allocation of an IP address.

The content of the allocated IP address management table 14 of the M2M management platform 3 is acquired by the server 1.

Communication between the M2M management platform 3 and the server 1 is packet communication via the public network 4. Note that, for a device as the server 1 that transmits and receives packets to/from an unspecified large number of devices, a public network use plan with pay-as-you-go or graded charging for use according to the packet communication volume is not typically used but a public network use plan with fixed charging for use independent of the packet communication volume is typically used. The packet communication between the M2M management platform 3 and the server 1 is therefore not related to a public network use plan in which charging is according to the packet communication volume.

Typically, a public network use plan with fixed charging for use is relatively high compared to a public network use plan with pay-as-you-go or graded charging for use.

Figure 2:
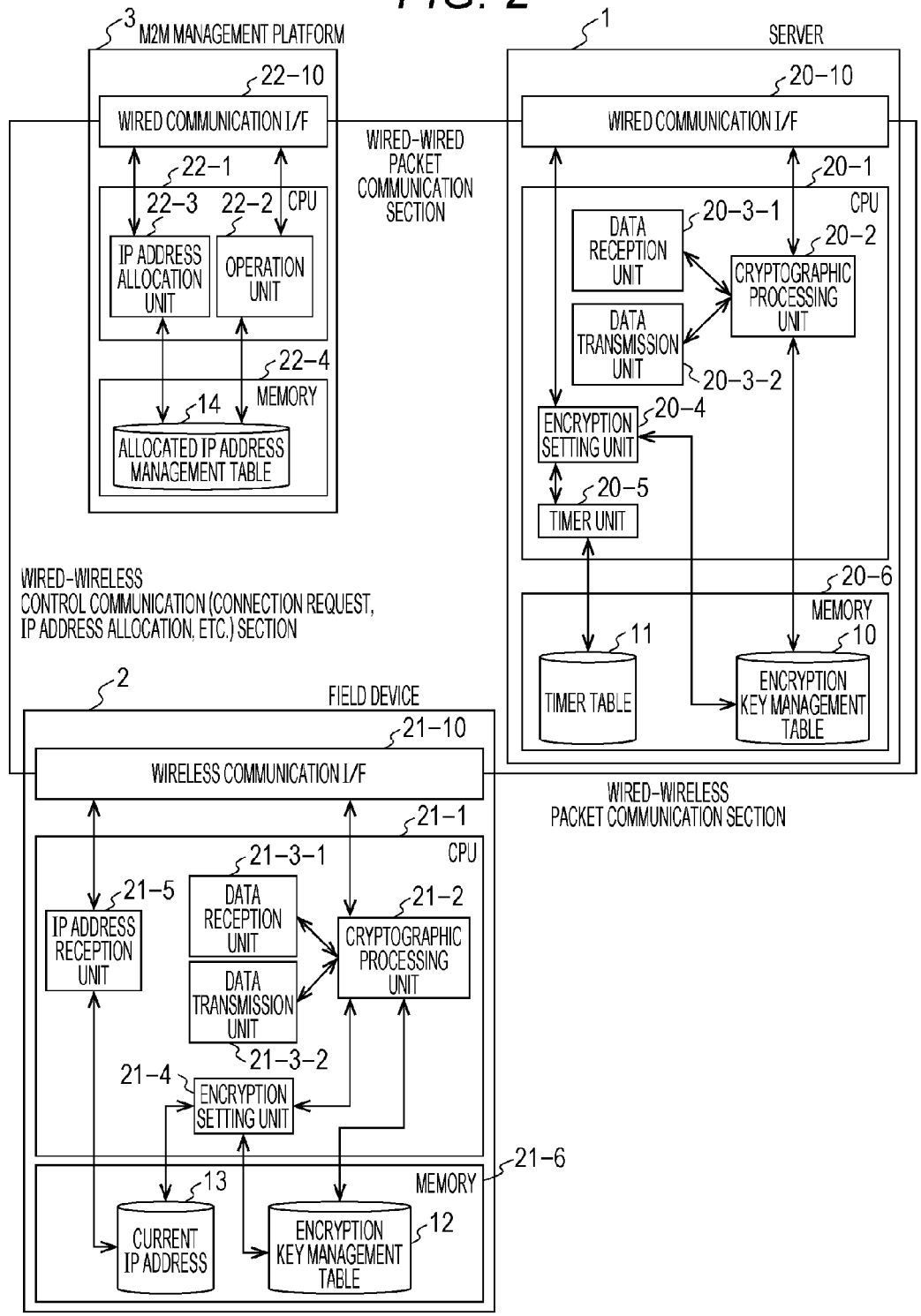
FIG. 2 is a block diagram illustrating functions of devices.

FIG. 2 is a block diagram illustrating function of the devices in the present embodiment.

A CPU 20-1 of the server 1 has functions of a cryptographic processing unit 20-2 for receiving encrypted data from field devices, a data reception unit 20-3, an encryption setting unit 20-4, and a timer unit 20-5 for managing transmission data periods from field devices.

A memory 20-6 of the server 1 holds the encryption key management table 10 and the timer table 11.

Figure 5:
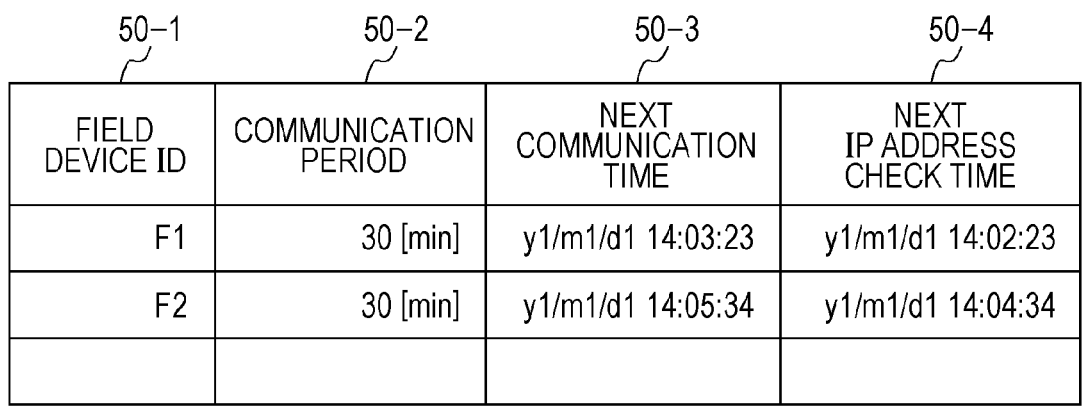
FIG. 5 illustrates details of a timer table of the server.

FIG. 5 illustrates details of the timer table 11 of the server 1.

The timer table 11 holds a field device ID 50-1, a communication period 50-2, a next communication time 50-3, and a next IP address check time 50-4.

In the communication period 50-2 of the timer table, a data period of each field device 2 is stored. For operation of the network system, the server 1 normally manages operation setting information of the field devices 2 and can also acquire data period information of the field devices 2.

The transmission data of the field devices 2 may be data collected by using sensors that are transmitted at coarse intervals in a target environment. The transmission period is about 30 minutes, for example, even when the transmission is frequent. The size of one transmission is about several hundred KB, for example.

The next communication time 50-3 is determined by referring to the communication period 50-2 after data communication from the field device 2 to the server 1 is actually conducted.

The next IP address check time 50-4 is time at which it is checked whether or not the IP address of the field device 2 is changed with the M2M management platform 3 prior to the next communication time 50-3. In the first embodiment, the IP address check time 50-4 is one minute before the next communication time 50-3. When the next IP address check time 50-4 of the field device 2 is reached, the timer unit 20-5 of the server 1 notifies the encryption setting unit 20-4 of the server 1 of the IP address check time according to the communication period 50-2 managed by the timer table 11.

A CPU 21-1 of the field device 2 has functions of a cryptographic processing unit 21-2 for transmitting encrypted data to the server, a data transmission unit 21-3, an encryption setting unit 21-4, and an IP address reception unit 21-5 for acquiring an IP address when the field device 2 connects to the public network 4.

The encryption setting unit 21-4 of the field device 2 compares the IP address held by the current IP address 13 and an IP address 40-2 in the encryption key management table 12.

The IP address reception unit 21-5 of the field device 2 monitors the current IP address 13 and, if the IP address is invalidated, issues a reconnection request to the M2M management platform 3 to receive allocation of an IP address. As a result of this processes, the IP address held by the current IP address 13 is changed.

A memory 21-6 of the field device 2 holds the encryption key management table 12 and the current IP address 13.

A CPU 22-1 of the M2M management platform 3 has functions of an operation unit 22-2 for receiving a viewing request from the server 1, and an IP address allocation unit 22-3 for providing IP addresses of the field devices 2.

The IP address allocation unit 22-3 of the M2M management platform 3 updates the allocated IP address management table 14. For example, with reallocation of an IP address to a field device, the IP address allocation unit 22-3 updates the last allocated IP address 60-2 associated with the field device ID 60-1 of a field device subjected to the allocation from the state of before update in FIG. 6A to the state of after update in FIG. 6B.

A memory 22-4 of the M2M management platform 3 holds the allocated IP address management table.

FIGS. 3A and 3B illustrate details of the encryption key management table 10 of the server 1. The encryption key management table 10 manages an encryption key determined between the server 1 and a field device 2 after the server 1 has received a request for initiating encrypted communication, which will be described later, from the field device 2. The determined encryption key is recorded in the encryption key management table 10 by the cryptographic processing unit 20-2 of the server 1.

Specifically, the encryption key management table 10 holds a field device ID 30-1 and a field device IP address 30-2 of the other party of communication, an IP address 30-3 of the server 1, an encryption key 30-4 to be used, and a communication direction 30-5.

The field device IP address 30-2 of the other party is updated by the encryption setting unit 20-4 of the server 1 where necessary. Note that FIG. 3A corresponds to before update by the encryption setting unit 20-4 and FIG. 3B corresponds to after update by the encryption setting unit 20-4.

The communication direction 30-5 is used to distinguish the communication direction since different encryption keys are used in the transmitting direction and in the receiving direction.

When IPsec is used for encryption, the respective rows in FIGS. 3A and 3B correspond to security association, and also include parameters such as a security protocol, an encryption system, an authentication system, an SID, and a term of validity in addition to the columns presented in FIGS. 3A and 3B. These parameters can be set in such a manner that the security protocol is set to the ESP, the encryption system is set to AES 128 bit-CBC, the authentication system is set to HMAC-SHA1, the SID is set to 0xFEDCBA98, and the term of validity is set to 24 hours, for example.

In the security association used in IPsec, an IP address at the start of encryption and an IP address at the end thereof have to be specified due to the specification thereof. Thus, when an IP address of a field device 2 is changed, the existing security association cannot be used any longer, and establishment of the security association and the like has to be newly conducted.

FIGS. 4A and 4B illustrate details of the encryption key management table 12 of the field device 2. The encryption key management table 12 manages an encryption key determined between field device 2 and the server 1 after the field device 2 has issued a request for initiation of encrypted communication, which will be described later, to the server 1. The determined encryption key is recorded in the encryption key management table 12 by the cryptographic processing unit 21-2 of the field device 2.

Specifically, the encryption key management table 12 holds an ID 40-1 and an IP address 40-2 of the present field device 2, a server IP address 40-3 of the other party of communication, an encryption key 40-4 to be used, and a communication direction 40-5.

The IP address 40-2 of the present field device 2 is updated by the encryption setting unit 21-4 of the field device 2 where necessary. Note that FIG. 4A corresponds to before update by the encryption setting unit 21-4 and FIG. 4B corresponds to after update by the encryption setting unit 21-4.

Details of the columns are the same as those in the encryption key management table 10 of the server 1.

Figure 9:
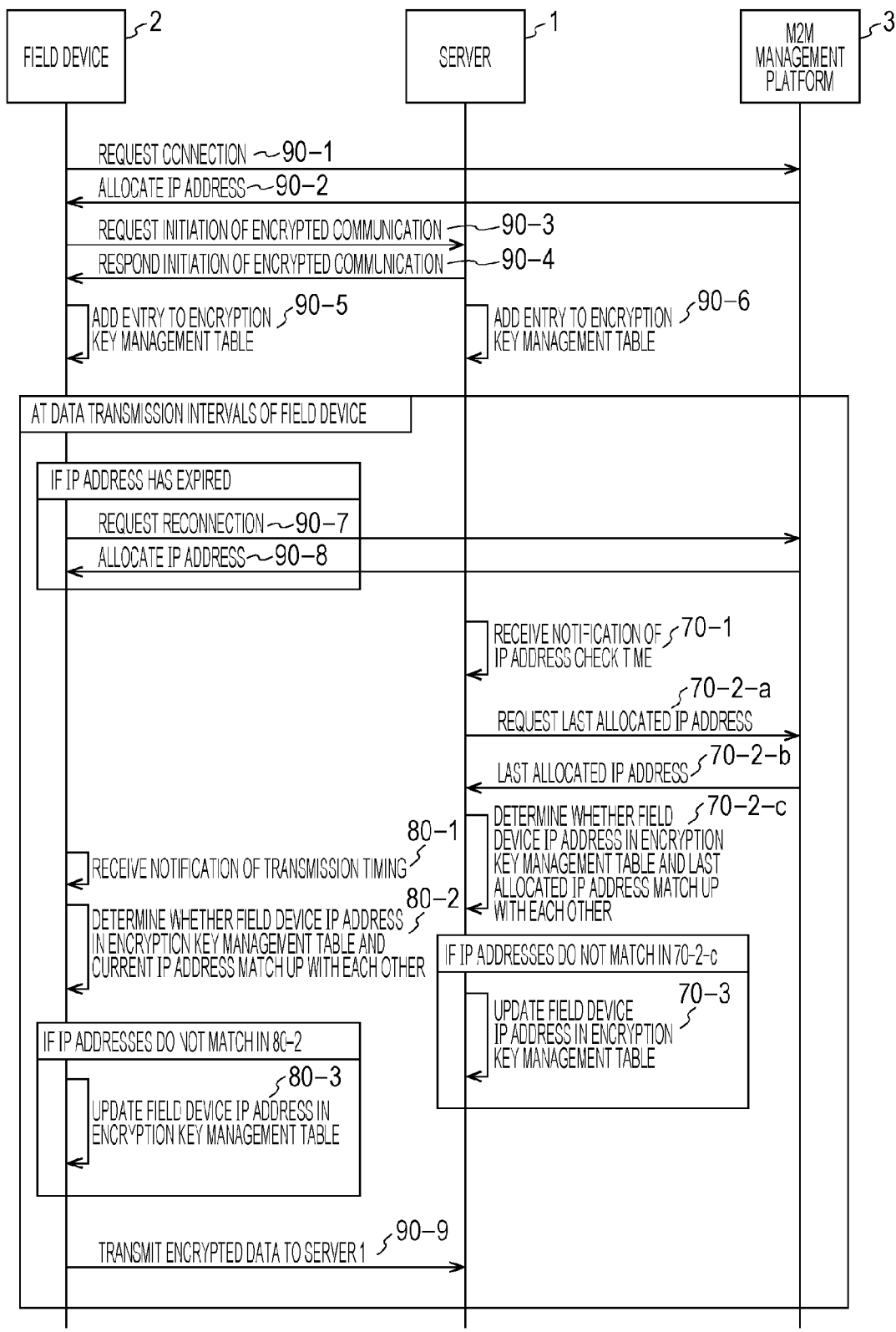
FIG. 9 is a sequence diagram illustrating time-series operations in a network system according to a first embodiment.

First, with reference to FIGS. 1 to 4B, procedures for starting the network system, that is, processes from connection of the field device 2 to the public network 4 until the field device 2 becomes able to transmit encrypted data to the server 1 will be described in association with FIG. 9 illustrating time-series operations in the network system.

When the field device 2 connects to the public network 4, the field device 2 issues a connection request to the IP address allocation unit 22-3 of the M2M management platform 3 from the IP address reception unit 21-5 of the field device 2 to acquire an IP address thereof. The field device 2 then receives an IP address from the M2M management platform 3 and saves the received IP address in the current IP address 13 (steps 90-1 and 90-2).

When the connection request is completed, the cryptographic processing unit 21-2 of the field device 2 can conduct packet communication with the cryptographic processing unit 20-2 of the server 1.

Subsequently, the cryptographic processing unit 21-2 of the field device 2 issues a request for initiating encrypted communication to the cryptographic processing unit 20-2 of the server 1 to determine an encryption key to be used in communication therebetween. The field device 2 and the server 1 then holds the determined encryption key together with IP address information in the encryption key management tables 10 and 12 (steps 90-3, 90-4, 90-5, and 90-6).

When IPsec is used for encryption, the request for initiating encrypted communication between the field device 2 and the server 1 is made in the IKE protocol.

The cryptographic processing unit 21-2 of the field device 2 refers to a column of the encryption key management table 12 associated with communication with the server 1 to encrypt a message and transmits the encrypted message.

The cryptographic processing unit 20-2 of the server 1 refers to a column of the encryption key management table 10 associated with communication with the field device 2 to decrypt and receive a message.

For replying an ACK message for acknowledgment from the server 1 to the field device 2, the encryption and the decryption are reversed, and the cryptographic processing unit 20-2 of the server 1 conducts encryption while the cryptographic processing unit 21-2 of the field device 2 conducts decryption.

Through the processes described above, the field device 2 connects to the public network 4 and becomes capable of transmitting encrypted data to the server 1.

Next, explanation will be given on the fact that transmission and reception of encrypted data using the encryption key management tables 10 and 12 cannot be conducted forever in a typical environment in which connection to the public network 4 is in a mobile manner.

In a case where the field device 2 has not conducted communication for a certain period of time (for about a few minutes to tens of minutes depending on the system, for example) after an IP address was allocated thereto, the M2M management platform 3 invalidates the allocated IP address and make it possible to be allocated to another device for effective use of a finite number of IP addresses.

Thus, when the field device 2 conducts communication after the IP address is invalidated, the IP address reception unit 21-5 has to reissue a connection request to the IP address allocation unit 22-3 of the M2M management platform 3 for reallocation of an IP address. As a result, the IP address of the field device 2 is changed from that before the reallocation.

When the IP address of the field device 2 is changed, the encryption key management table 12 of the field device 2 does not manage the changed IP address, and therefore does not contain a column associated with the changed IP address. As a result, since the cryptographic processing unit 21-2 does not have any encryption key associated with the changed IP address, the cryptographic processing unit 21-2 cannot encrypt transmission data with an encryption key associated with the changed IP address, and cannot transmit encrypted data to the server 1.

For transmitting encryption data from the field device 2 to the server 1 again according to a technique of the related art, it can be assumed that the cryptographic processing unit 21-2 of the field device 2 reissues a request for initiating encrypted communication to the cryptographic processing unit 20-2 of the server 1 or notifies the cryptographic processing unit 20-2 of the changed IP address to make necessary modifications.

With such a technique of the related art, however, packet communication between the field device 2 and the server 1 via the public network 4 is carried out each time the IP address of the field device 2 is changed. For the field device 2, a public network use plan in which the use charge is dependent on the packet communication volume may be applied thereto, and there is the issue to reduce the packet communication volume.

In view of such the issue, a network system to which the present invention is applied can avoid an increase in the volume of communication between a field device 2 and the server 1 and continue encrypted communication therebetween even under an environment in which the IP addresses of the field devices 2 are dynamically changed.

Hereinafter, a technique that allows encrypted communication to be continued will be described with reference to FIGS. 7 to 9.

Figure 7:
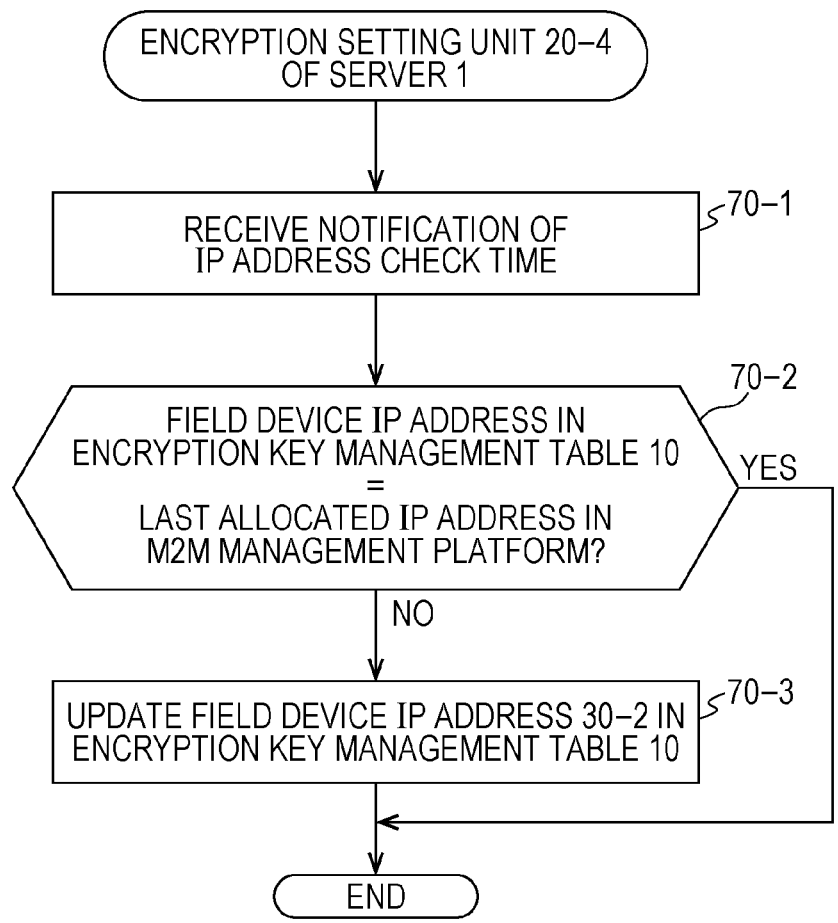
FIG. 7 is a flowchart illustrating operation of an encryption setting unit of the server.

FIG. 7 is a flowchart illustrating operation of the encryption setting unit 20-4 of the server 1. Details of steps will be presented below in association with those in FIG. 9.

Step 70-1: when the next IP address check time 50-4 of a field device 2 is reached, the encryption setting unit 20-4 of the server 1 receives a notification of the IP address check time from the timer unit 20-5. The notification of the IP address check time contains the field device ID of the field device 2 to be checked. At the point of step 70-1, the encryption key management table 10 of the server 1 is in the state of FIG. 3A. Hereinafter, a case in which a notification of the IP address check time is issued for a field device whose field device ID if F1 will be described.

Step 70-2: the encryption setting unit 20-4 of the server 1 transmits a last allocated IP address request for acquiring the latest IP address of the field device ID notified in step 70-1 to the operation unit 22-2 of the M2M management platform 3 (step 70-2-a).

The encryption setting unit 20-4 of the server 1 acquires the IP address last allocated to the field device ID notified in step 70-1 from the IP addresses managed in the allocated IP address management table 14 of the M2M management platform 3 via the operation unit 22-2 of the M2M management platform 3 (step 70-2-b).

The encryption setting unit 20-4 of the server 1 then determines whether or not the IP address (for example: A1.A1.A1.A1) of the present field device ID in the encryption key management table 10 matches with the last allocated IP address acquired from the M2M management platform 3.

If the encryption setting unit 20-4 has determined that the IP addresses match with each other, the operation of the encryption setting unit 20-4 of the server 1 is terminated (step 70-2-c).

If the encryption setting unit 20-4 has determined that the IP addresses do not match with each other, a process of step 70-3 is carried out (step 70-2-c).

Step 70-3: if the encryption setting unit 20-4 of the server 1 has determined that the IP addresses do not match with each other in step 70-2-c, the encryption setting unit 20-4 of the server 1 updates the field IP address 30-2 associated with the present field device ID 30-1 in the encryption key management table 10 with the latest IP address (for example: A1'.A1'.A1'.A1') acquired in step 70-2-b. FIG. 3B illustrates the updated encryption key management table 10.

Note that the encryption key and parameters other than the field device IP address 30-2 are held without any change.

Figure 8:
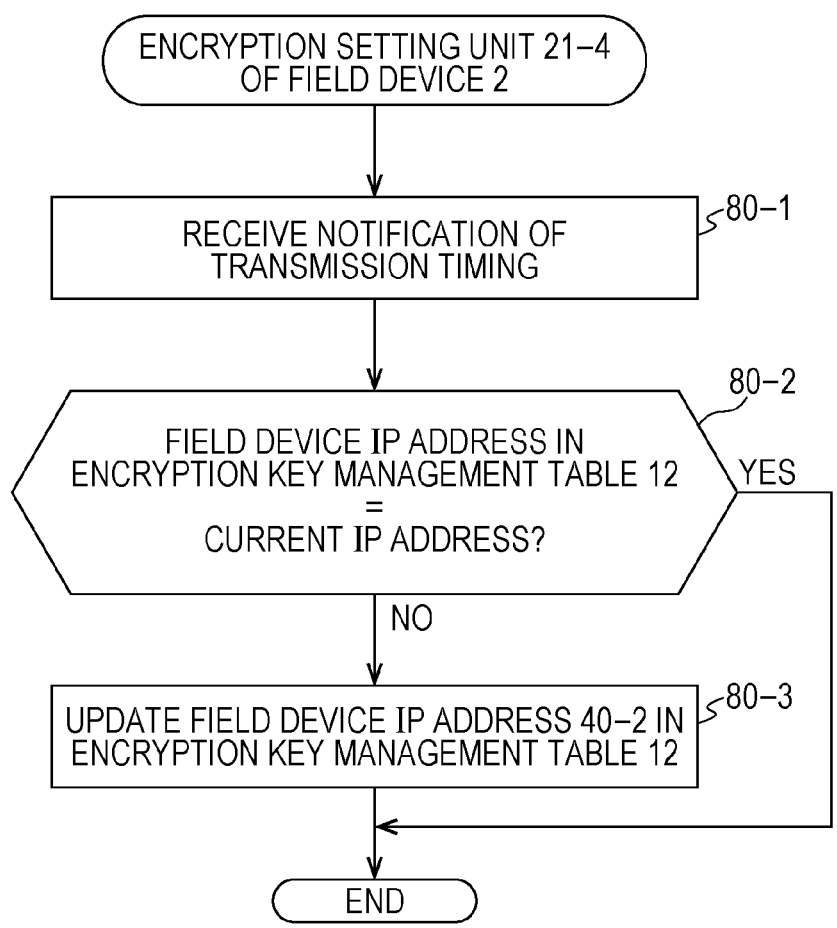
FIG. 8 is a flowchart illustrating operation of an encryption setting unit of the field device.

FIG. 8 is a flowchart illustrating operation of the encryption setting unit of 21-4 of the field device 2.

Details of steps will be presented below in association with those in FIG. 9.

First, steps 90-7 and 90-8 that are steps carried out when the term of validity of the IP address allocated in step 90-2 has expired after the elapse of a certain period of time and the IP address is invalidated will be described.

Step 90-7: the field device 2 issues a reconnection request to the IP address allocation unit 22-3 of the M2M management platform 3.

Step 90-8: the field device receives a new IP address from the M2M management platform 3, and saves the newly allocated IP address in the current IP address 13.

Next, steps 80-1 to 80-3 carried out at data transmission intervals of the field device regardless of whether or not the certain period of time has elapsed will be described.

Step 80-1: the encryption setting unit 21-4 of the field device 2 receives notification of transmission timing from the data transmission unit 21-3 so as to check the IP address of the field device 2 itself at a timing immediately before transmitting encrypted data to the server 1. At the point of step 80-1, the encryption key management table 12 of the field device 2 is in the state of FIG. 4A.

Step 80-2: the encryption setting unit 21-4 of the field device 2 determines whether or not the field device IP address 40-2 (for example: A1.A1.A1.A1) associated with the field device ID thereof managed in the encryption key management table 12 and the IP address held in the current IP address 13 match with each other.

If the encryption setting unit 21-4 has determined that the IP addresses match with each other, the operation of the encryption setting unit 21-4 of the field device 2 is terminated.

If the encryption setting unit 21-4 has determined that the IP addresses do not match with each other, a process of step 80-3 is carried out.

Step 80-3: if the encryption setting unit 21-4 of the field device 2 has determined that the IP addresses do not match with each other in step 80-2, the encryption setting unit 21-4 of the field device 2 updates the field IP address 40-2 associated with its field device ID in the encryption key management table 12 with the IP address (for example: A1'.A1'.A1'.A1') held in the current IP address 13. FIG. 4B illustrates the updated encryption key management table 12. Note that the encryption key and parameters other than the field device IP address 40-2 are not changed.

After completing the steps illustrated in FIGS. 7 and 8, the field device 2 transmits encrypted data to the server 1 by using the updated encryption key management table 12, and the server 1 uses the encrypted data by using the updated encryption key management table 10 (step 90-9).

As described above, in the network system to which the present invention is applied, since the server 1 acquires a last allocated IP address from the M2M management platform 3, the server 1 can autonomously determine the consistency of the last allocated IP address with the IP address of a field device 2 to be checked and use an encryption key associated with the field device 2 to be checked in association with an appropriate IP address even in an environment in which IP addresses of field devices 2 are dynamically changed. Furthermore, since the field device 2 holds an IP address allocated by the M2M management platform 3 in connecting to the public network 4 in the current IP address 13, the field device 2 can autonomously manage the consistency between its IP address and the IP address managed in the encryption key management table 12 and use an encryption key associated with the field device 2 itself in association with an appropriate IP address at a timing of transmitting encrypted data to the server 1.

Specifically, even when the IP address of a field device 2 has been changed, the server 1 and the field device 2 can autonomously associate the changed IP address with an encryption key determined between the server 1 and the field device 2 without conducting packet communication therebetween via the public network 4, the field device 2 and the server 1 can conduct encrypted data transmission 90 without conducting communication other than the encrypted data transmission 90.

In a case where IPsec is used for encryption, even when the IP address of a field device 2 is changed in operation of the network system, the operation is such that encrypted data to which an ESP header provided with the same SPI (ID) as that before the IP address is changed is added is transmitted and the server 1 successfully receive the encrypted data without any communication in the IKE protocol or other communication being conducted from the field device 2 to the server 1.

While essential operations in the present embodiment have been described above, the network system may conduct other operations than those presented above for improvement of operation stability or for other reasons in actual implementation.

For example, an operation in which the field device 2 checks a communication device two or three minutes before conducting periodic data transmission and the periodic data transmission is conducted later if reacquisition of an IP address is required, or an operation in which communication for confirming connection before conducting actual data communication from the field device 2 to the server 1 can be conceived.

Note that the features of the present embodiment are not limited to those described above.

For example, the field device 2 is not limited to connecting to the public network 4 but may connect to a wired or wireless local LAN area.

Furthermore, for example, the connection request from the field device 2 to the M2M management platform may be according to a system in which the request is conducted through control communication in the PPP or the like and an IP address is allocated in the IPCP protocol or may be according to a system in which an IP address is allocated by a DHCP server.

In addition, for example, while the M2M management platform 3 has functions of a network environment for allocating an IP address when a field device 2 makes a connection request to the public network 4 and an M2M management service for receiving an inquiry for IP address allocation from the server 1, the M2M management platform 3 may alternatively be a DHCP server and means for acquiring an IP address allocation log.

Furthermore, for example, while the next IP address check time 50-4 in the timer table 11 in FIG. 5 is determined on the basis of the next communication time 50-3, the IP address may be checked at a timing when the M2M management platform 3 notifies the server 1 of allocation of an IP address of the field device 2 if the M2M management platform 3 can issue such a notification.

Examples of advantageous effects produced by the network system of the first embodiment will be presented below.

As an example, a network system in which a field device 2 encrypts data of a little less than 1 KB and transmits the encrypted data to the server 1 50 times a day (about once in every 30 minutes), and receives an ACK response is assumed. Since the field device 2 conducts communication about once in every 30 minutes, the M2M management platform 3 determines that no communication has been conducted for a predetermined time period (for several minutes, for example) and invalidates an IP address allocated to the field device 2. It is thus assumed that the IP address of the field device 2 is changed every time.

When IPsec is used for the encryption system, the field device 2 and the server 1 uses the IKE protocol for a request for initiating encrypted communication. The IKE protocol requires communication of six packets of about 1.5 KB in an aggressive mode until completion. Transmission of encrypted data after implementation of the IKE protocol requires communication of two packets of about 1 KB in total of the data transmission and the ACK response.

According to the technique of the related art, the field device 2 transmits encrypted data after implementing the IKE protocol. Thus, when the data volume is converted to that per one communication, communication of eight packets of about 2.5 KB obtained by combining six packets of 1.5 KB for the IKE protocol and two packets of 1 KB for the encrypted data transmission is conducted. The communication volume converted to that per day is 400 packets of 125 KB, for example. The communication volume converted to that per month is 12,000 packets of 3.75 MB, for example.

In the first embodiment to which the present invention is applied, when the field device 2 has once implemented the IKE protocol, the field device 2 can subsequently use the encryption key associated to the field device 2 in association with an appropriate IP address, and thus can transmit encrypted data even when the IP address of the field device 2 is changed. For security reasons, a term of validity is often set for an encryption key, and it is desirable to update the encryption key by implementing the IKE protocol again at least once a day. Thus, the communication volume converted to that per one communication is two packets of about 1 KB for encrypted data transmission. The communication volume converted to that per day is 106 packets of about 31.5 KB obtained by adding one time of IKE protocol to 50 times of encrypted data transmission. The communication volume converted to that per month is 3,180 packets of about 945 KB.

As described above, according to the first embodiment as compared to the technique of the related art, the communication volume of the field device 2 can be reduced to about ⅓ in the number of packets and about ¼ in the data amount. In particular, a significant effect can be produced in a network system in which a charging plan with pay-as-you-go or graded charging according to the communication volume is applied to field devices 2, and the effect can be expected to be increased as the number of operating field devices 2 is larger and as the number of operating days of the field devices 2 is larger.

Second Embodiment

The second embodiment is directed to reduce the number of inquiries in the processes of inquiring of the M2M management platform 3 an allocated IP address by the server 1 in step 70-2 when the number of field devices 2 in a network system is larger.

FIG. 10 illustrates details of the timer table 11 of the server 1 according to the second embodiment.

The timer table 11 of the second embodiment further holds a time range 100-1.

While different next IP address check time 50-4 is specified for different field device ID 50-1 in the timer table 11 of the first embodiment, the time range 100-1 of IP address check is specified and the next IP address check times 50-4 of one or more field devices whose next communication times 50-3 fall within the range are set to the same timing in the timer table 11 of the second embodiment.

As a result, the operations in the steps of the encryption setting unit 20-4 of the server 1 in the first embodiment as illustrated in FIG. 7 are modified as follows in the second embodiment.

Step 70-1: when there are more than one field device 2 with the same next IP address check time 50-4 in the timer table 11, the timer unit 20-5 of the server 1 notifies the encryption setting, unit 20-4 of the IDs of the field devices 2 to be checked together.

The encryption setting unit 20-4 of the server 1 then receives a notification that the IP address check time for the field devices 2 has been reached from the timer unit 20-5. The notification of the IP address check time contains the field device IDs for the field devices 2 to be checked.

Step 70-2: the encryption setting unit 20-4 of the server 1 transmits a last allocated IP address request for acquiring the latest IP addresses of the field devices ID notified in step 70-1 to the operation unit 22-2 of the M2M management platform 3 (step 70-2-*a*).

The encryption setting unit 20-4 of the server 1 acquires the IP addresses last allocated to the field device IDs notified in step 70-1 together by one request from the IP addresses managed in the allocated IP address management table 14 of the M2M management platform 3 via the operation unit 22-2 of the M2M management platform 3 (step 70-2-*b*).

Note that 70-2-*c* in FIG. 9 is the same as that in the first embodiment.

As described above, according to the network system of the second embodiment, since the server 1 manages the data transmission periods of multiple field devices 2 in a table, the server 1 can check multiple latest IP addresses for multiple field devices 2 together, which can improve the efficiency of processing.

Third Embodiment

The third embodiment is directed to prevent a packet loss when the IP address of a field device 2 is changed and when both a packet encrypted before the IP address change and a data packet encrypted after the IP address change may be present.

In the first embodiment, when the server 1 checks the IP address change of a field device 2 in step 70-2 of FIG. 7, a row of the encryption key management table 10 in FIG. 3A is also changed in step 70-3. Thus, if a data packet encrypted before the IP address change is present, the data packet encrypted before the IP address change cannot be received if the encryption key management table 10 of FIG. 3B is used.

FIG. 11 illustrates details of the encryption key management table 10 of the server 1 according to the third embodiment.

When the server 1 has detected an IP address change of a field device 2 in step 70-2, while the field device IP address 30-2 is changed as illustrated in FIG. 3B in the encryption key management table 10 in the first embodiment, a row 110-1 holding the field device IP address before the change remains and is copied into a row 110-2 on which only the field device IP address is changed as illustrated in FIG. 11 in the encryption key management table 10 in the third embodiment.

Since the server 1 refers to the row 110-1 for receiving the packet encrypted before the IP address change of the field device 2 and refers to the row 110-2 for receiving the packet encrypted after the IP address change, the server 1 can carry out packet reception in both cases.

Note that the encryption key management table 10 need not continue to hold the row 110-1 associated with the IP address before the IP address change of the field device 2, and may delete the row 110-1 after the elapse of a certain period of time or when the row 110-2 associated with the IP address after the IP address change is referred to.

Furthermore, if an ID for identifying a row of the encryption key management table 10 such as an SID when IPsec is used for the encryption system is present, the ID is changed to a value that is not being used in the network system in copying and modifying rows of the encryption key management tables 10 and 12 after the IP address change. Selection of a value that is not being used may be conducted in any manner.

As described above, according to the network system of the present embodiment, since the server 1 has both the row 110-1 associated with the IP address before the IP address change of the field device 2 and the row 110-2 associated with the IP address after the IP address change, a packet loss can be avoided in a situation in which both a packet encrypted before the IP address change and a packet encrypted after the IP address change are present.

Note that the present invention is not limited to the embodiments described above, but includes various modifications. For example, the embodiments described above are described in detail for simple explanation of the present invention, and are not necessarily limited to those including all the features described above. Some of the features in the embodiments may additionally include other features, may be deleted, or may be replaced with other features. Furthermore, the configurations, functions, processing units, processing means, and the like described above may be partially or entirely implemented in hardware by being designed using integrated circuits, for example.

What is claimed is:

1. A communication system comprising:
a plurality of concentrators, a server, and a management server, which are connected via a network,
wherein the management server includes:
a first processor connected with a first memory storing instructions that, when executed by the first processor, causes the first processor to:
allocate a plurality of IP addresses to the concentrators when the concentrators connect to the network; and
store IP address management information for managing the IP addresses allocated to each the concentrators for a predetermined time,
wherein the server includes:
a second processor connected with a second memory storing instructions that, when executed by the second processor, causes the second processor to:
manage an encryption key set between the server and a first concentrator of the concentrators to which a first IP address of the IP addresses is allocated in association with the first IP address;
acquire a second IP address of the IP addresses that is allocated to the first concentrator from the management server when a check time is reached, compare the acquired second IP address with the first IP address managed by the server, and associate the encryption key associated with the first IP address with the second IP address when the first IP address and the second IP address do not match with each other as a result of the comparison so the encryption key is associated with the first IP address and the second IP address;
receive encrypted packet data from the first concentrator; and
decrypt the received packet data with the encryption key, and
wherein the first concentrator include first concentrator includes:
a third processor connected with a third memory storing instructions that, when executed by the third processor, causes the third processor to:
manage the encryption key set between the server and the first concentrator in association with the first IP address allocated by the management server;
hold the second IP address allocated by the management server when connecting to the network;
compare the first IP address with the second IP address before encrypting and transmitting the packet data to the server, and update the first IP address associated with the encryption key with the second IP address when the first IP address and the second IP address do not match with each other as a result of the comparison;
encrypt the packet data with the encryption key; and
transmit the encrypted packet data to the server.

2. The communication system according to claim 1, wherein the second processor is further caused to:
when the first IP address and the second IP address match with each other as a result of the comparison, decrypt the received packet data with the encryption key set between the server and the first concentrator to which the first IP address is allocated, and
when the first IP address and the second IP address do not match with each other as a result of the comparison, decrypt the received packet data with the encryption key associated with the first IP address, the encryption key being associated with the second IP address.

3. The communication system according to claim 1, wherein the third processor is further caused to:
when the first IP address and the second IP address match with each other as a result of the comparison, encrypt the packet data with the encryption key set between the server and the first concentrator and associated with the first IP address, and
when the first IP address and the second IP address do not match with each other as a result of the comparison, encrypt the packet data with the encryption key for which the first IP address is updated with the second IP address.

4. The communication system according to claim 1, wherein the second processor is further caused to:
when the first IP address and the second IP address do not match with each other as a result of the comparison, update the first IP address associated with the encryption key with the second IP address.

5. The communication system according to claim 1, wherein the concentrators are wireless terminals,
wherein the third processor is further caused to:
transmit the packet data encrypted with the encryption key periodically to the server,
wherein the second processor is further caused to:
store timer information for managing a transmission period of the packet data transmitted from the first concentrator, and
acquire the second IP address allocated to the first concentrator from the management server when a check time is reached according to the timer information.

6. The communication system according to claim 5, wherein the second processor is further caused to:
acquire multiple second IP addresses allocated to multiple concentrators associated with multiple check times contained within a predetermined range from the management server when one of the check times is reached according to the timer information.

7. The communication system according to claim 1, wherein the first processor is further caused to:
allocate the second IP address to the first concentrator on the basis of a request for allocation of an IP address transmitted from the first concentrator.

8. The communication system according to claim 1, wherein the packet data is encrypted using IPsec.

9. An encryption setting method in a communication system including a plurality of concentrators, a server, and a management server, which are connected via a network, the encryption setting method comprising:
operating the management server to:
allocate a plurality of IP addresses to the concentrators when the concentrators connect to the network, and
manage the IP addresses allocated to the concentrators for a predetermined time;
operating the server to:
manage an encryption key set between the server and a first concentrator of the concentrators to which a first IP address of the IP addresses is allocated as first encryption key management information associated with the first IP address,
acquire a second IP address of the IP addresses allocated to the first concentrator from the management server when a check time is reached, compare the acquired second IP address with the first IP address managed by the server, and associate the encryption key associated with the first IP address with the second IP address when the first IP address and the second IP address do not match with each other as a result of the comparison so the encryption key is associated with the first IP address and the second IP address,
receive encrypted packet data from the first concentrator, and
decrypt the received packet data with the encryption key; and
operating the first concentrator to:
manage the encryption key set between the server and the first concentrator as second encryption key management information associated with the first IP address allocated by the management server,
hold the second IP address allocated by the management server when connecting to the network as IP address holding information,
compare the first IP address with the second IP address before encrypting and transmitting the packet data to the server, and update the first IP address associated with the encryption key with the second IP address when the first IP address and the second IP address do not match with each other as a result of the comparison,
encrypt the packet data with the encryption key; and
transmit the encrypted packet data to the server.

* * * * *